United States Patent
Lee et al.

(10) Patent No.: US 7,339,613 B2
(45) Date of Patent: Mar. 4, 2008

(54) METHOD OF MONITORING DIGITAL CAMERA CAPABLE OF INFORMING USER OF INADEQUATE PHOTOGRAPHING

(75) Inventors: Byung-kwon Lee, Seongnam-si (KR); Byung-deok Nam, Seoul (KR)

(73) Assignee: Samsung Techwin Co., Ltd., Shangwon (KR)

( * ) Notice: Subject to any disclaimer, the term of this patent is extended or adjusted under 35 U.S.C. 154(b) by 766 days.

(21) Appl. No.: 10/775,620

(22) Filed: Feb. 10, 2004

(65) Prior Publication Data
US 2004/0169768 A1    Sep. 2, 2004

(30) Foreign Application Priority Data
Feb. 10, 2003   (KR)   ................ 10-2003-0008141

(51) Int. Cl.
*H04N 5/228* (2006.01)
(52) U.S. Cl. ................... 348/208.99; 348/333.04; 348/346
(58) Field of Classification Search ........... 348/333.12, 348/333.04, 333.02, 333.01, 349, 345, 348, 348/347, 346, 229.1, 221.1, 352, 362, 364, 348/208.99, 208.12, 208.15, 208.4, 208.2, 348/208.1; 382/236, 255, 238, 232
See application file for complete search history.

(56) References Cited

U.S. PATENT DOCUMENTS

2003/0117514 A1*  6/2003  Weintroub et al. .......... 348/345
2004/0119876 A1*  6/2004  Ohmori et al. ............. 348/362
2004/0201699 A1* 10/2004  Parulski et al. ........ 348/207.99
2005/0146619 A1*  7/2005  Kobayashi et al. ...... 348/208.1

FOREIGN PATENT DOCUMENTS

KR    10-2004-0056675 A    7/2004

* cited by examiner

*Primary Examiner*—Lin Ye
*Assistant Examiner*—Nelson D. Hernández
(74) *Attorney, Agent, or Firm*—Drinker Biddle & Reath LLP (57) ABSTRACT

A method of controlling a digital camera includes performing photographing of an object, determining whether the amount of exposure is appropriate and shakiness is present, and notifying a user of such information if the amount of exposure is not appropriate or shakiness is present. The determination step includes reading a focus value of the object, reading a lower limit value of a compressed file size set to correspond to the read focus value of the object at a compression rate and a resolution set by the user, and determining that the amount of exposure is not appropriate and shakiness is present if the size of a present compressed file of image data obtained from the photographing is smaller than the lower limit value of the compressed file size.

4 Claims, 7 Drawing Sheets

METHOD OF MONITORING DIGITAL CAMERA CAPABLE OF INFORMING USER OF INADEQUATE PHOTOGRAPHING

This application claims priority to Korean Patent Application No. 2003-8141, filed on Feb. 10, 2003, in the Korean Intellectual Property Office, the disclosure of which is incorporated herein in its entirety by reference.

FIELD OF THE INVENTION

The present invention relates to a method of monitoring a digital camera, and more particularly, to a method of monitoring a digital camera in which digital image data is generated by photographing an object and the image data is stored in a recording medium.

BACKGROUND OF THE INVENTION

Typical digital cameras, for example, the "Digimax 350SE" model manufactured by Samsung Techwin Co., Ltd., does not have the capability of informing a user when an inadequate photograph has been taken after the user photographs an object with the digital camera. Most typical digital cameras have a function that allows the user to review a photograph as soon as he or she photographs an object. For example, when the user photographs an image with a digital camera, the image is displayed on a display device. However, most users find viewing the image on a display device to be inconvenient, and even when they do view the image on the display, they sometimes do not realize that the photographing is inadequate. Thus, typical digital cameras do not have a means for informing the user when an object has been photographed inadequately so that the user can photograph the object again.

SUMMARY OF THE INVENTION

To solve the above problem, the present invention provides a method of monitoring a digital camera and informing a user when an inadequate photograph of an object has been taken so that the user can photograph the object again.

An embodiment of the present invention is directed to a method of monitoring a digital camera that includes photographing an object, determining whether the amount of exposure is appropriate and whether shakiness is present, and notifying a user of such information if the amount of exposure is not appropriate or shakiness is present. The determination step comprises calculating a focus value of the object, calculating a lower limit value of a compressed file size set to correspond to the calculated focus value of the object at a compression rate and a resolution set by the user, and determining that the amount of exposure is not appropriate and shakiness is present if the size of a present compressed file of image data obtained from the photographing is smaller than the lower limit value of the compressed file size.

Assuming that X is the focus value of the object, N is the number of samples, $X_i$ is the focus value of an i-th sample, $Y_i$ is the size of a compressed file size of the i-th sample at the compression rate and resolution set by the user, $$a \text{ is } \frac{\left(\sum_{i=1}^{N} X_i\right)\left(\sum_{i=1}^{N} Y_i\right) - N\left(\sum_{i=1}^{N} X_i Y_i\right)}{\left(\sum_{i=1}^{N} X_i\right)^2 - N\left(\sum_{i=1}^{N} X_i^2\right)}$$

$$\text{and } b \text{ is } \frac{\left(\sum_{i=1}^{N} Y_i\right)\left(\sum_{i=1}^{N} X_i^2\right) - N\left(\sum_{i=1}^{N} X_i\right)\left(\sum_{i=1}^{N} X_i Y_i\right)}{N\left(\sum_{i=1}^{N} X_i^2\right) - \left(\sum_{i=1}^{N} X_i\right)},$$

the lower limit value of the compressed file size is set as k(aX+b) where k is between 0.7 and 0.8.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
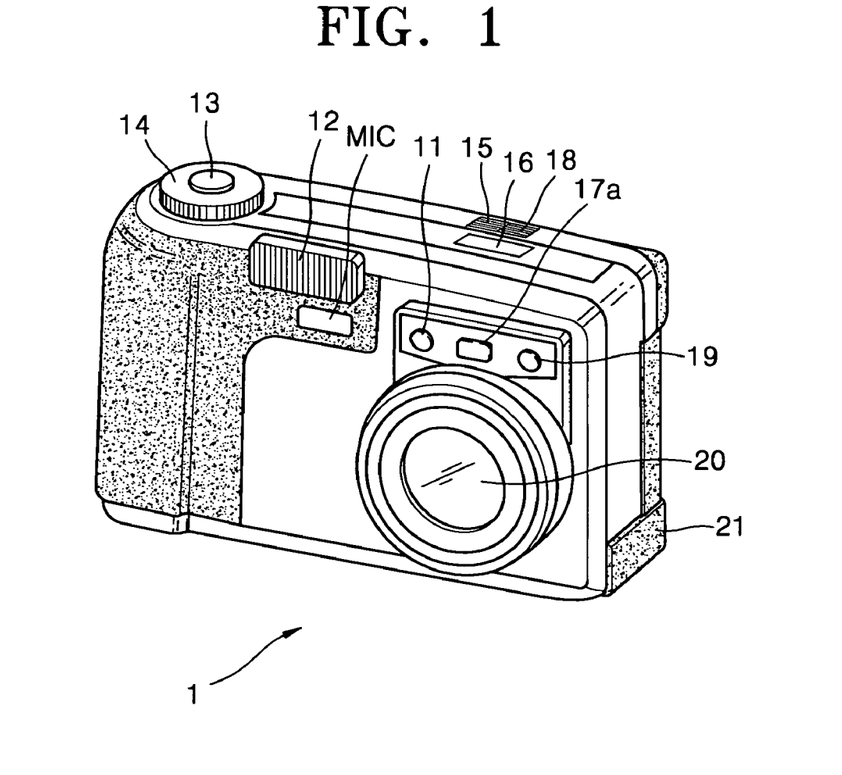
FIG. 1 is a perspective view illustrating a digital camera according to a preferred embodiment of the present invention.

Referring to FIG. 1, a microphone MIC, a self-timer lamp 11, a flash 12, a shutter button 13, a mode dial 14, a function selection button 15, a photographing information display portion 16, a viewfinder 17a, a function block button 18, a flash light amount sensor 19, a lens portion 20, and an external interface portion 21 are provided on the front and upper surfaces of a digital camera 1 according to a preferred embodiment of the present invention.

The self-timer lamp 11 flickers in a self-timer mode during a set time after the shutter button 13 is pressed until the photographing starts. The mode dial 14 is used by a user to set a variety of modes. The modes include, but are not limited to, a still image photographing mode, a night view photographing mode, a motion picture photographing mode, a reproduction mode, a computer connection mode, and a system setting mode. The function selection button 15 is used by the user to select one of operational modes of the digital camera 1, for example, the still image photographing mode, the night view photographing mode, the motion picture photographing mode, and the reproduction mode. The photographing information display portion 16 displays information of the respective functions related to photographing. The function block button 18 is used by the user to select each function displayed on the photographing information display portion 16.

Figure 2:
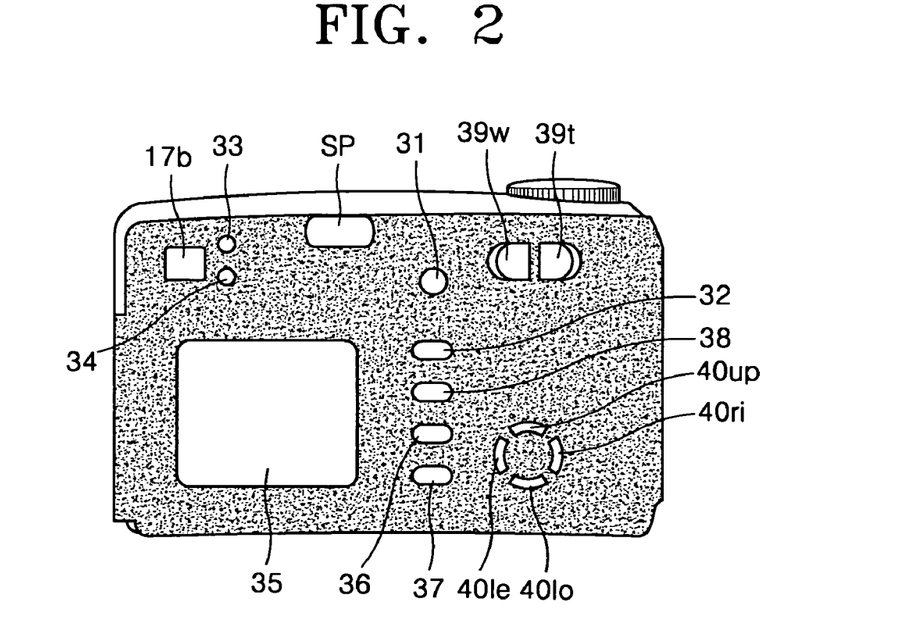
FIG. 2 is a rear view illustrating the digital camera of FIG. 1.

Referring to FIG. 2, a speaker SP, a power button 31, a monitor button 32, an auto-focus lamp 33, a viewfinder 17b, a flash ready lamp 34, a display panel 35, a confirm/delete button 36, an enter/play button 37, a menu button 38, a wide angle zoom button 39w, a telephoto zoom button 39t, an up movement button 40up, a right movement button 40ri, a down movement button 40do, and a left movement button 40le are arranged on the rear side of the digital camera 1 according to the present invention.

The monitor button 32 is used to control the operation of the display panel 35. For example, when the monitor button 32 is first pressed, an image of an object and the respective photographing information are displayed on the display panel 35. When the monitor button 32 is pressed again, only an image of the object is displayed on the display panel 35. When the monitor button 32 is pressed a third time, the power that is applied to the display panel 35 is discontinued. The auto-focus lamp 33 operates when an input image is well focused. The flash ready lamp 34 operates when the flash 12 of FIG. 1 is in a ready mode. The confirm/delete button 36 is used as a confirm button or a delete button in the process in which the user sets each mode. The enter/play button 37 is used by the user to finish inputting data in the menu mode, and to start or stop reproducing the data in the reproduction mode. The menu button 38 is used to display the menu of the mode selected by the mode dial 14. The up movement button 40up, the right movement button 40ri, the down movement button 40do, and the left movement button 40le are used by the user to set each mode.

The overall structure of the digital camera of FIG. 1 is described below with reference to FIG. 3.

An optical system OPS including a lens portion and a filter portion optically processes light from an object to be photographed. The lens portion in the optical system OPS includes a zoom lens, a focus lens, and a compensation lens.

An optoelectric converting portion (OEC) of a charge coupled device (CCD) or complementary metal-oxide-semiconductor (CMOS) converts light from the optical system OPS to an electric analog signal. A digital signal processor (DSP) 507 controls the operation of the OEC and an analog-to-digital converting portion. A correlation double sampler and an analog-to-digital converter (CDS-ADC) device 501 (the analog-to-digital converting portion) processes an analog signal from the optoelectric converting portion OEC and removes high frequency noise and adjusts the amplitude as well as converts the processed analog signal into a digital signal. The DSP 507 generates a digital image signal classified by brightness and chromaticity signals, by processing the digital signal from the CDS-ADC device 501.

The digital image signal from the DSP 507 is temporarily stored in a DRAM (Dynamic Random Access Memory) 504. The algorithm and set data needed for the operation of the DSP 507 is stored in an EPROM (Erasable Programmable Read Only Memory) 505. A memory card is inserted in or detached from a memory card interface 506.

A digital image signal from the DSP 507 is transmitted to a LCD driving portion 514 so that an image is displayed on the color LCD panel 35.

The digital image signal from the DSP 507 can be transmitted through a USB (universal serial bus) connection portion 21a and an RS232C interface 508 and a connection portion 21b thereof, as a serial communication, and a video filter 509 and a video output portion 21c, as a video signal.

An audio processor 513 outputs a voice signal from a microphone MIC to the DSP 507 or the speaker SP and outputs an audio signal from the DSP 507 to the speaker SP.

The user input portion INP includes the shutter button 13 of FIG. 1, the mode dial 14 of FIG. 1, the function selection button 15 of FIG. 1, the function block button 18 of FIG. 1, the monitor button 32 of FIG. 2, the confirm/delete button 36 of FIG. 2, the enter/play button 37 of FIG. 2, the menu button 38 of FIG. 2, the wide angle zoom button 39w of FIG. 2, the telephoto zoom button 39t of FIG. 2, the up movement button 40up of FIG. 2, the right movement button 40ri of FIG. 2, the down movement button 40do of FIG. 2, and the left movement button 40le of FIG. 2.

The microcontroller 512 controls the lens driving portion 510 and accordingly the zoom motor $M_Z$, the focus motor $M_F$, and the aperture motor $M_A$ drive the zoom lens, the focus lens, and the aperture in the OPS, respectively. A light emitting portion LAMP driven by the microcontroller 512 includes the self-timer lamp 11, the auto focus lamp 33, and a flash ready lamp 34. The microcontroller 512 controls the operation of the flash controller 511 according to the signal from the flash light amount sensor 19.

In the control algorithm of the microcontroller 512, after photographing is performed according to the operation by the user, the image data obtained from the photographing operation is analyzed by the DSP 507 to determine whether the amount of exposure is appropriate and shakiness is present. If it is determined that the amount of exposure is not appropriate or shakiness is present, the user is notified of the information, which will be described below.

Figure 3:
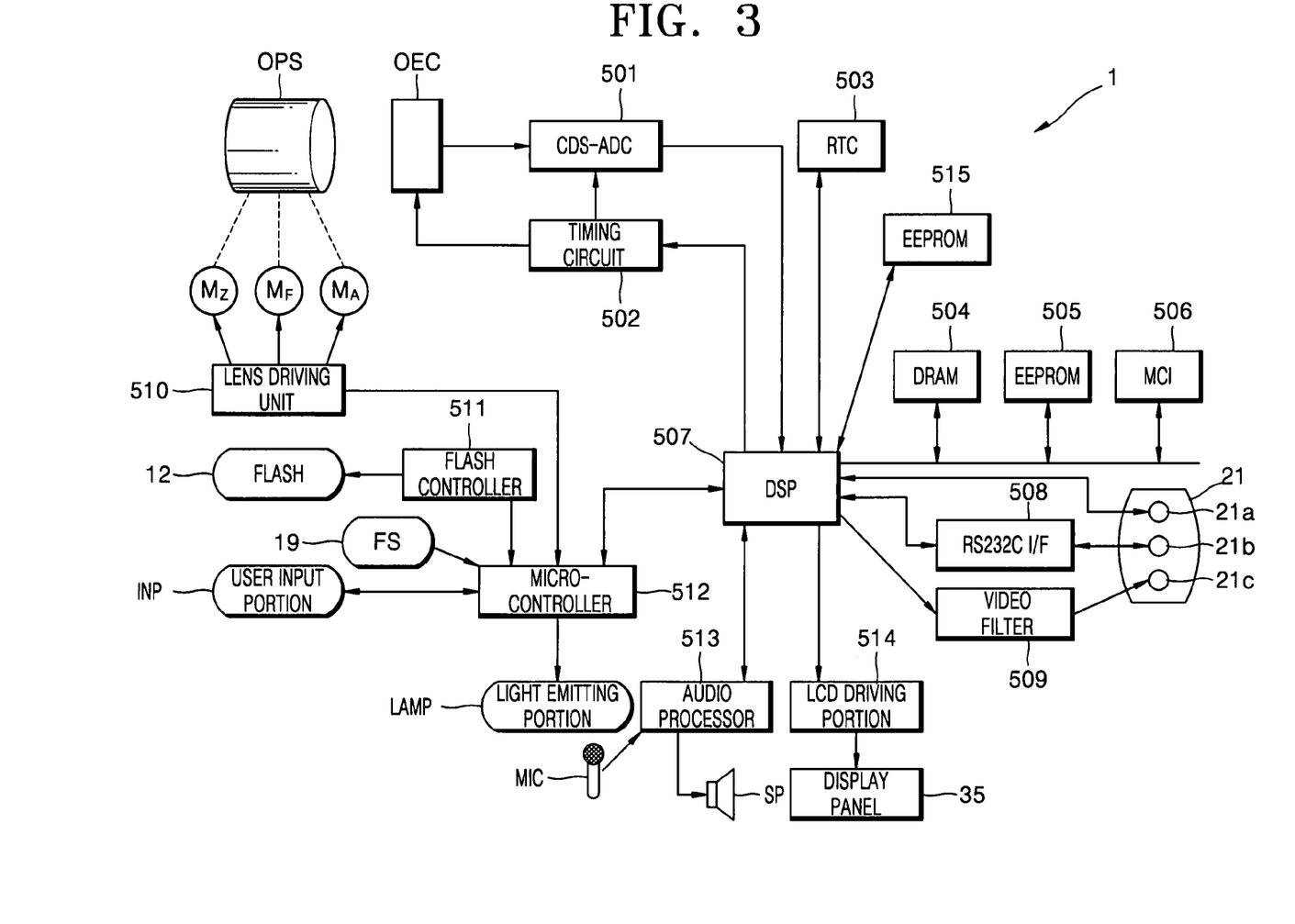
FIG. 3 is a block diagram illustrating the overall structure of the digital camera of FIG. 1.
Figure 4:
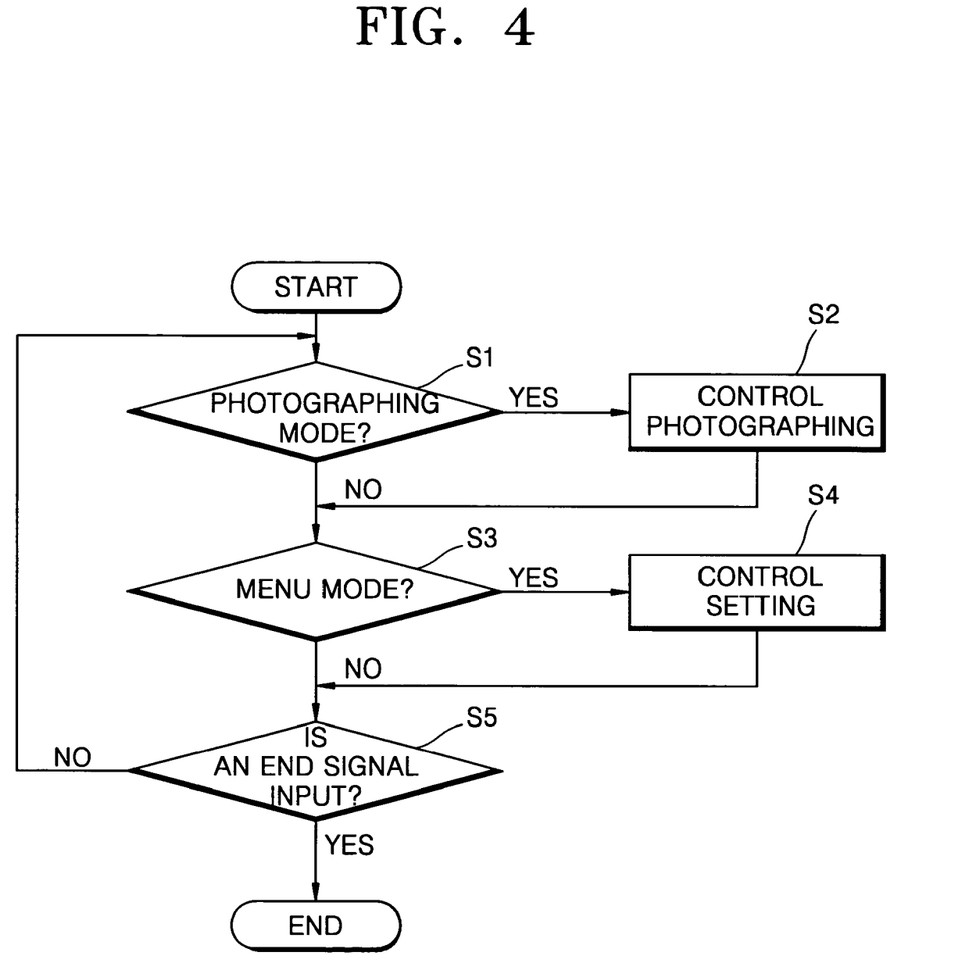
FIG. 4 is a flow chart for explaining the overall control algorithm of the microcontroller of FIG. 3.

FIG. 4 shows the overall control algorithm of the microcontroller 512 of FIG. 3. Referring to FIG. 4, Step S1 determines whether a photographing mode is set. When the photographing mode is set, the microcontroller 512 performs the photographing control step S1. Whether a menu mode is set is determined in Step S3. When the menu mode is set, the microcontroller 512 performs a setting control step S4 to set the operational conditions of a camera. In Step S5, the above steps are repeated until an external end signal is transmitted.

Figure 5:
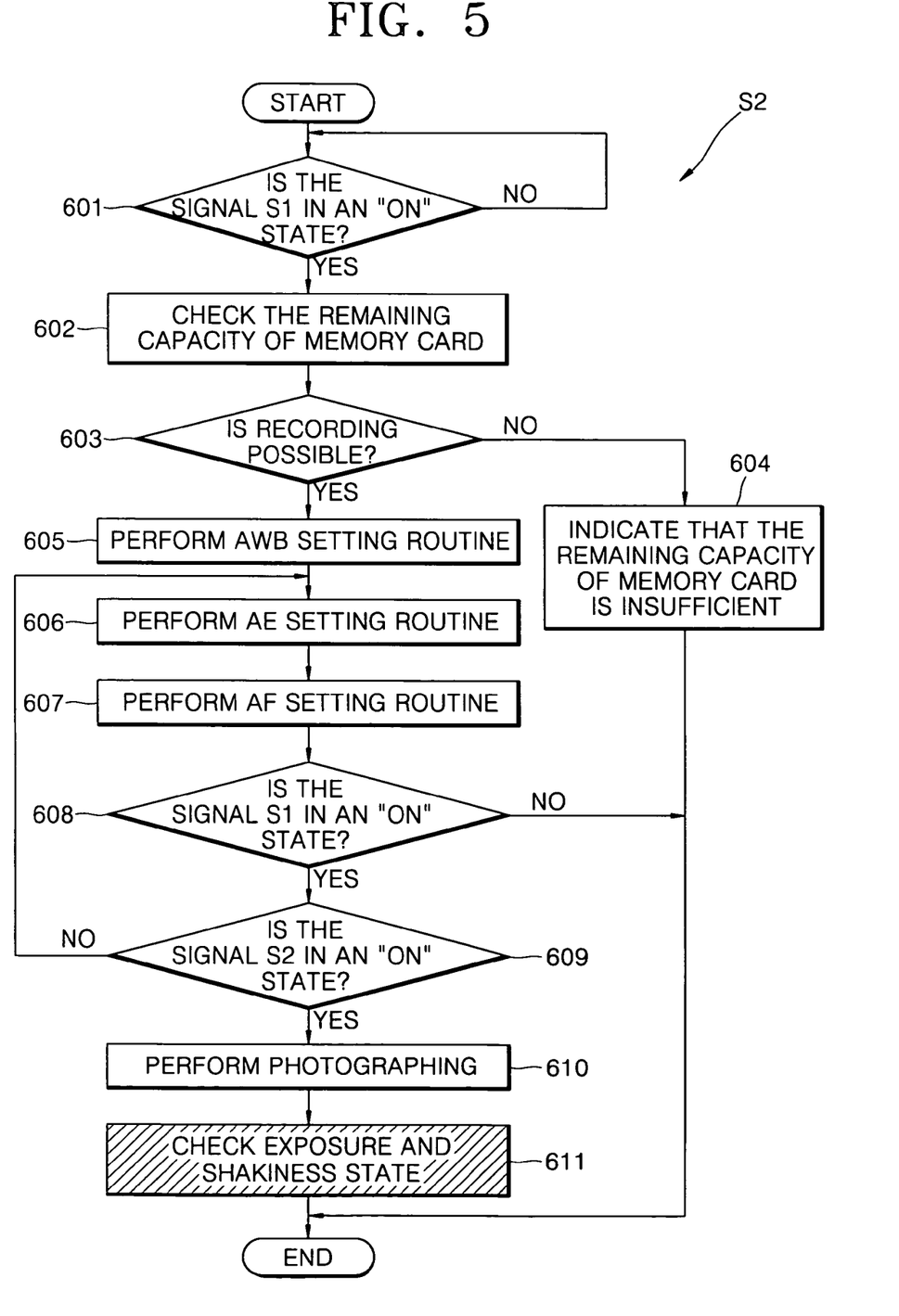
FIG. 5 is a flow chart for explaining the detailed algorithm of the photographing control step of FIG. 4.

FIG. 5 shows a detailed algorithm of the photographing control step S2 of FIG. 4. The shutter button 13 included in the user input portion INP has a two-step structure. That is, when a user presses the shutter button 13 in the first step after operating the wide angle zoom button 39w or telephoto zoom button 39t, a signal S1 from the shutter button 13 is turned on. When the user presses the shutter button 13 in the second step, a signal S2 from the shutter button 13 is turned on. Thus, the photographing control algorithm of FIG. 5 starts when the user presses the shutter button 13 in the first step (Step 601).

Referring to FIGS. 3 and 5, in the algorithm of the photographing control (Step S2 of FIG. 5), when the signal S1 is turned on (Step 601), the remaining capacity of the memory card is checked (Step 602). It is then determined whether the remaining capacity of the memory card is sufficient for recording a digital image signal (Step 603). If the remaining capacity is not sufficient for recording, a message is displayed indicating that the capacity of the memory card is not sufficient (Step 604).

If the remaining capacity is sufficient for recording, an automatic white balance (AWB) mode is initially performed to set the related parameters (Step 605). Next, an automatic exposure (AE) mode is performed so that the amount of exposure with respect to incident luminance is calculated.

Then, the aperture drive motor $M_A$ is driven according to the calculated exposure amount (Step 606). Next, an automatic focusing mode (AF) mode is performed, and the position of the focus lens FL is set (Step 607).

Whether the signal S1, that is a first step signal from the shutter button 13, is in an "ON" state is determined (Step 608). If the signal S1 is not in the "ON" state, then the execution program is terminated since the user does not have an intention to take a photograph. If the signal S1 is in the "ON" state, it is determined whether the signal S2 is in the "ON" state (Step 609). If the signal S2 is not in the "ON" state, then the execution program is moved to Step 606 since the user did not press the second step of the shutter button 13 to take a photograph, If the signal S2 is in the "ON" state, the user has pressed the second step of the shutter button 13 to take a photograph, and the photographing operation is performed (Step 610). That is, the microcontroller 512 operates the DSP 507 so that the optoelectric converting portion OEC and the CDS-ADC device 501 are operated by the timing circuit 502. Next, the image data is converted and compressed by the digital signal processor 507. The compressed image file is stored in the memory card through the memory card interface 506.

Next, the image data obtained form the photographing is analyzed by the DSP 507 so that the appropriateness of the amount of exposure and the presence of shakiness are determined. If it is determined that the amount of exposure is inappropriate and shakiness is present, the user is notified of the information (Step 611)

Figure 6:
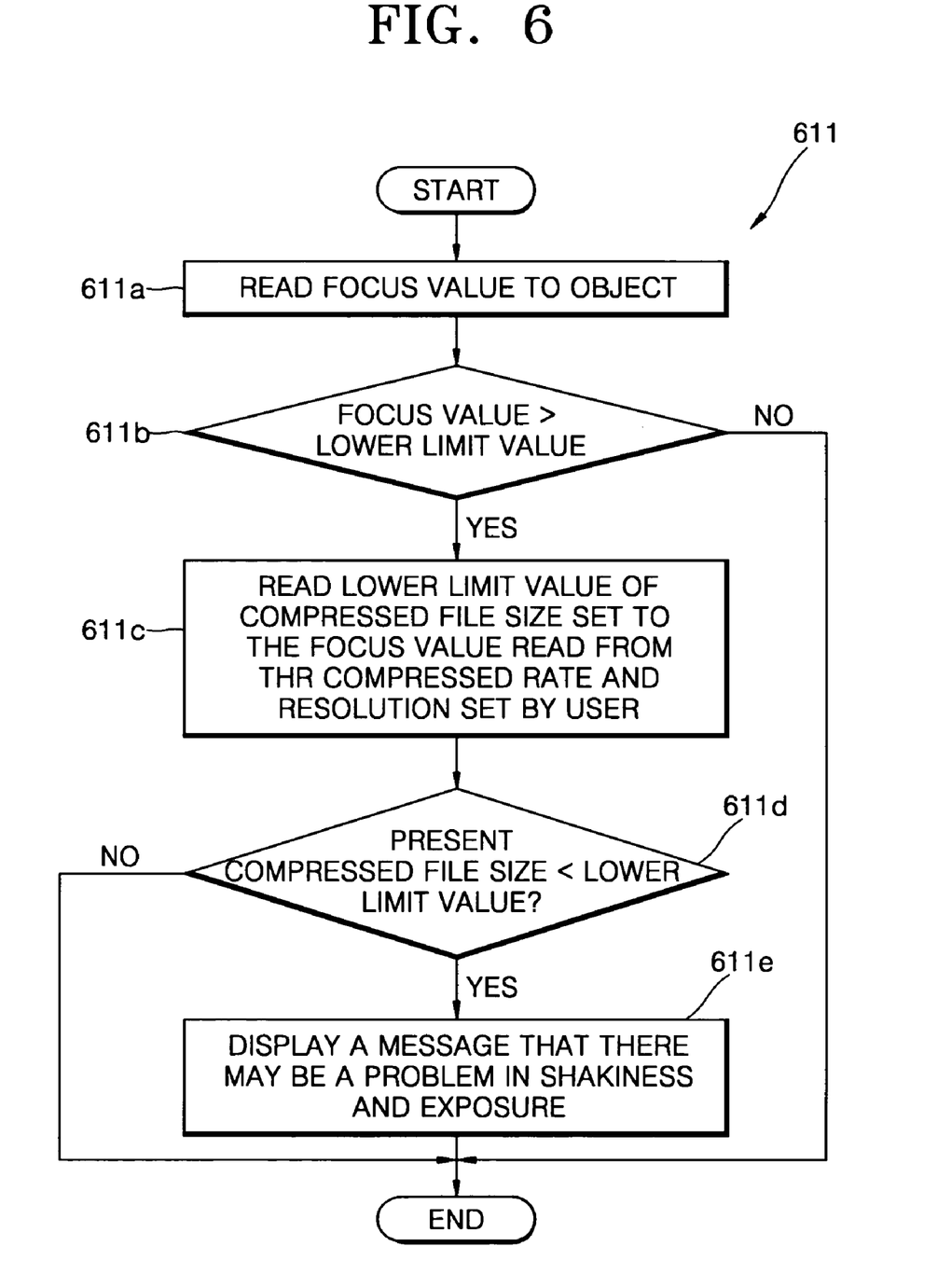
FIG. 6 is a flow chart for explaining the algorithm of the exposure and shakiness checking step of FIG. 5.
Figure 7A:
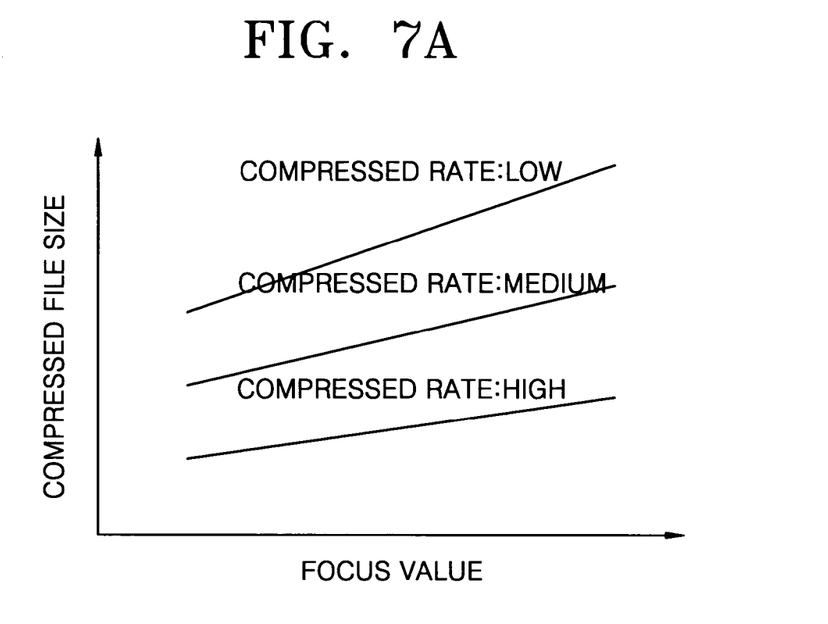
FIG. 7A is a graph showing the relationship between a compression rate and a compressed file size.
Figure 7B:
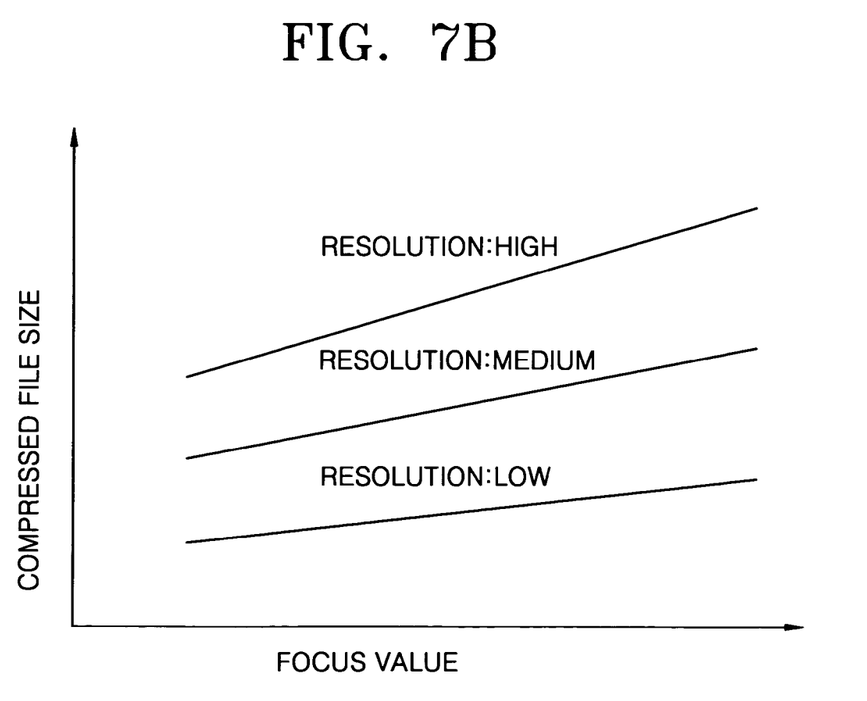
FIG. 7B is a graph showing the relationship between a resolution and a compressed file size.
Figure 8:
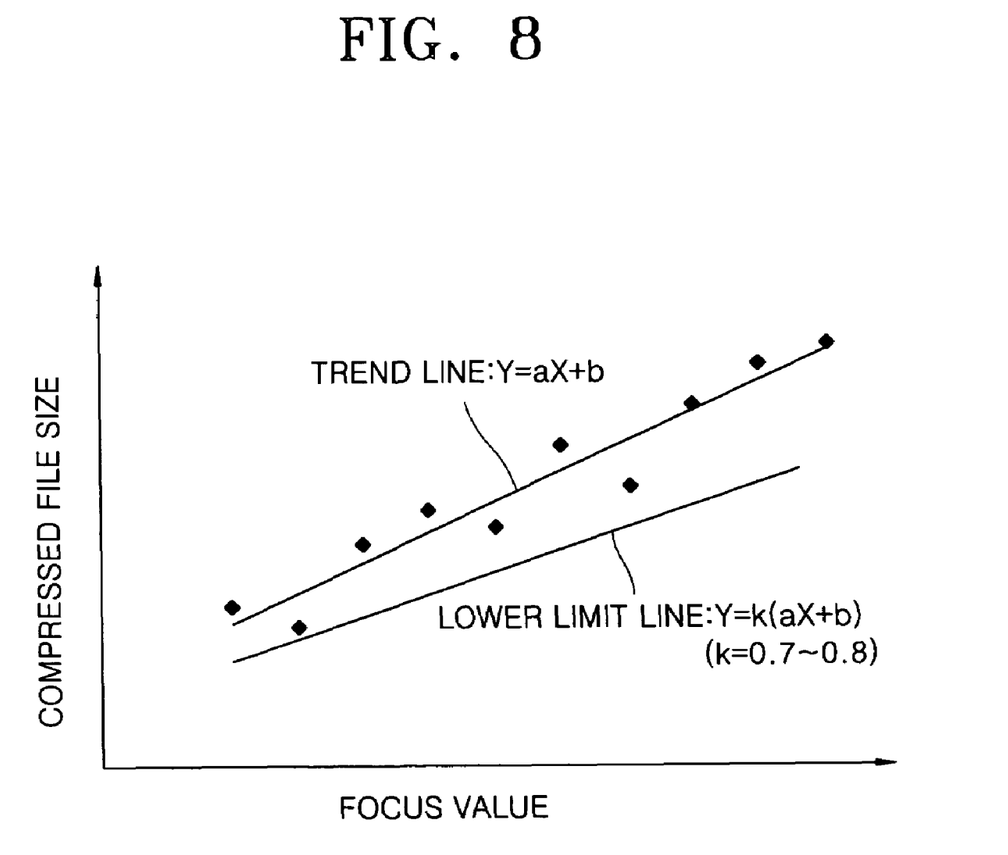
FIG. 8 is a graph showing a trend line and a lower limit line for setting a lower limit value of the compressed file size corresponding to a focus value.

FIG. 6 is a flow chart for explaining the algorithm of the exposure and shakiness determination step (Step 611) of FIG. 5. FIG. 7A is a graph showing the relationship between a compression rate and a compressed file size. FIG. 7B is a graph showing the relationship between a resolution and a compressed file size. FIG. 8 is a graph showing a trend line and a lower limit line for setting a lower limit value of the compressed file size corresponding to a focus value. Referring to FIGS. 6 through 8, the algorithm of the exposure and shakiness determination step (Step 611 of FIG. 5) is described as follows.

First, a focus value with respect to an object is determined (Step 611*a*). The focus value is defined as the sum of the high frequency component values of an image. The high frequency component value of an image is a component in which a change in a gray level is rapid with respect to a boundary of the object when the image is represented by brightness only, not by color, that is, by a gray image. In contrast, the low frequency component of an image is a component in which a change in the gray level is gradual. In a typical automatic focusing (AF) method, the sum of high frequency component values is calculated with respect to the boundary of the object while moving a focus lens FL, and the position of the focus lens FL when the sum is maximum is determined as a focused position. The reason for focusing in the above method is because a clear image which is focused has a large amount of the high frequency components whereas an unclear image which is not focused has a small amount of the high frequency components and a large amount of low frequency components. As a result, the focus value is obtained by summing the high frequency component values of an image. Thus, the focus value is determined when an automatic focusing mode is performed prior to photographing the object.

Next, when the focus value to the object is smaller than a lower limit value, the program is terminated because the reliability in the determination step is deteriorated by external factors such as image noise (Step 611*b*).

When the focus value of the object is greater than a lower limit value, the lower limit value of a compressed file size is determined. The lower limit value of the compressed file size corresponds to the focal value of the object determined from the compression rate and resolution set by the user (Step 611*c*). An image having a high complexity due to many boundaries has a large focus value before photographing and the size of the compressed file of the photographed image data increases. In other words, when photographing is performed normally without a problem in the shakiness or exposure, the focus value before photographing and the size of a compressed file of the photographed image data is proportional to each other. Thus, when a factor that lowers the complexity of an image, such as shakiness or overexposure/underexposure occurs while the image is being captured before photographing but after the photographing control step (Step S2), the actual size of the compressed file is smaller than the normal size of the compressed file corresponding to the focus value read before the photographing control step (Step S2) after the photographing mode determination step (Step S1). The size of a compressed file of the photographed image data varies according to the compression rate and resolution set by the user. The size of a compressed file of the photographed image data is in inversely proportional to the compression rate as shown in FIG. 7A and proportional to the resolution as shown in FIG. 7B. Thus, the size of a compressed file of the photographed image data must be set in consideration of the compression rate and resolution set by the user. A method of setting a lower limit value of the compressed file size corresponding to the focus value before photographing using the above feature is described as follows.

As shown in FIG. 8, a trend line of a compressed file size corresponding to a focus value is obtained through tests of samples. Assuming that X is the focus value of an object, Y is the trend value of the compressed file size, N is the number of samples, $X_i$ is the focus value of the i-th sample, and $Y_i$ is the compressed file size of the i-th sample at the compression rate and resolution set by a user, the trend line can be determined according to Equation 1.

$$Y = aX + b, \quad \text{[Equation 1]}$$

$$\text{wherein } a = \frac{\left(\sum_{i=1}^{N} X_i\right)\left(\sum_{i=1}^{N} Y_i\right) - N\left(\sum_{i=1}^{N} X_i Y_i\right)}{\left(\sum_{i=1}^{N} X_i\right)^2 - N\left(\sum_{i=1}^{N} X_i^2\right)} \text{ and } b =$$

$$\frac{\left(\sum_{i=1}^{N} Y_i\right)\left(\sum_{i=1}^{N} X_i^2\right) - N\left(\sum_{i=1}^{N} X_i\right)\left(\sum_{i=1}^{N} X_i Y_i\right)}{N\left(\sum_{i=1}^{N} X_i^2\right) - \left(\sum_{i=1}^{N} X_i\right)}$$

When the trend Y of the compressed file size corresponding to the read focus value X of the object at the compression rate and resolution by the user is determined, the lower limit value $Y_i$ of the compressed file size is set with respect to the trend value Y. The lower limit value $Y_i$ of the compressed file size is preferably set to be between 70% and 80% of the trend value Y, which can be expressed as in Equation 2.

$$Y_L = kY = k(aX - b), \text{ wherein } k = 0.7\text{-}0.8 \quad \text{[Equation 2]}$$

After the lower limit value $Y_L$ of the compressed file size corresponding to the read focus value X of the object is obtained from Equation 2, the present compressed file size of the image data obtained from the photographing is compared to the lower limit value $Y_L$. If the present compressed file size of the image data obtained from photographing is smaller than the lower limit value of the set compressed file size, a message indicating that there may be a problem in the shakiness and the exposure is displayed (Steps S611*d* and S611*e*).

As described above, the method of monitoring a digital camera according to the present invention provides for the user to be immediately notified of the presence of problems of exposure and shakiness shortly after photographing an object so that another photograph may be taken of the object.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of monitoring a digital camera comprising:
   determining whether an amount of exposure is inappropriate and whether shakiness is present during the photographing of an object and notifying a user of the digital camera when the amount of exposure is inappropriate or when shakiness is present, wherein determining whether the amount of exposure is inappropriate and whether shakiness is present includes:
   calculating a focus value of the object;
   calculating a lower limit value of a compressed file size wherein the lower limit value of the compressed file size corresponds to a focus value of the object at a compression rate and a resolution set by the user; and
   determining that the amount of exposure is not appropriate and shakiness is present when the size of a compressed file of image data obtained from the photographing of the object is smaller than the lower limit value of the compressed file size.

2. A method of monitoring a digital camera comprising:
   determining whether an amount of exposure is inappropriate and whether shakiness is present during the photographing of an object and notifying a user of the digital camera when the amount of exposure is inappropriate or when shakiness is present, wherein determining whether the amount of exposure is inappropriate and whether shakiness is present includes:
   calculating a focus value of the object;
   calculating a lower limit value of a compressed file size wherein the lower limit value of the compressed file size corresponds to a focus value of the object at a compression rate and a resolution set by the user; and
   determining that the amount of exposure is not appropriate and shakiness is present when the size of a compressed file of image data obtained from the photographing of the object is smaller than the lower limit value of the compressed file size;

wherein, assuming that X is the focus value of the object, N is the number of samples, $X_i$ is the focus value of an i-th sample, $Y_i$ is the size of a compressed file size of the i-th sample at the compression rate and resolution set by the user $$a \text{ is } \frac{\left(\sum_{i=1}^{N} X_i\right)\left(\sum_{i=1}^{N} Y_i\right) - N\left(\sum_{i=1}^{N} X_i Y_i\right)}{\left(\sum_{i=1}^{N} X_i\right)^2 - N\left(\sum_{i=1}^{N} X_i^2\right)}$$

$$\text{and } b \text{ is } \frac{\left(\sum_{i=1}^{N} Y_i\right)\left(\sum_{i=1}^{N} X_i^2\right) - N\left(\sum_{i=1}^{N} X_i\right)\left(\sum_{i=1}^{N} X_i Y_i\right)}{N\left(\sum_{i=1}^{N} X_i^2\right) - \left(\sum_{i=1}^{N} X_i\right)},$$

the lower limit value of the compressed file size is set as k(aX+b) in which 0<k<1.

3. The method as claimed in claim 2, wherein k is between about 0.7 and 0.8.

4. A means for determining whether the amount of exposure is inappropriate and whether shakiness is present during the photographing of an object with a digital camera comprising:
   a means for calculating a focus value of the object;
   a means for calculating a lower limit value of a compressed file size wherein the lower limit value of the compressed file size corresponds to a focus value of the object at a compression rate and a resolution set by a user; and
   a means for determining that the amount of exposure is not appropriate and shakiness is present when the size of a compressed file of image data obtained from the photographing of the object is smaller than the lower limit value of the compressed file size.

* * * * *